United States Patent [19]

Sono et al.

[11] Patent Number: 5,600,344

[45] Date of Patent: Feb. 4, 1997

[54] LIQUID CRYSTAL DISPLAY

[75] Inventors: Koichi Sono, Hiratsuka; Mamoru Miyawaki, Isehara; Akira Ishizaki, Atsugi; Katsuhisa Ogawa, Machida; Katsuhito Sakurai, Hadano, all of Japan

[73] Assignee: Canon Kabushiki Kaisha, Tokyo, Japan

[21] Appl. No.: 561,153

[22] Filed: Nov. 21, 1995

Related U.S. Application Data

[63] Continuation of Ser. No. 391,082, Feb. 21, 1995, abandoned, which is a continuation of Ser. No. 283,144, Aug. 1, 1994, abandoned, which is a continuation of Ser. No. 22,510, Feb. 25, 1993, abandoned.

[30] Foreign Application Priority Data

Feb. 28, 1992 [JP] Japan .................... 4-075980

[51] Int. Cl.⁶ ......................................... G09G 3/36
[52] U.S. Cl. ........................... 345/87; 345/100; 345/103
[58] Field of Search .................... 345/103, 100, 345/87; 368/84, 242; 359/54, 55, 58

[56] References Cited

U.S. PATENT DOCUMENTS

| | | | |
|---|---|---|---|
| 3,968,639 | 7/1976 | Berets et al. | 368/84 R |
| 4,255,806 | 3/1981 | Fahrenschon et al. | 368/84 X |
| 4,743,896 | 5/1988 | Hashimoto et al. | 345/87 |
| 4,824,212 | 4/1989 | Taniguchi | 345/103 X |

FOREIGN PATENT DOCUMENTS

| | | | |
|---|---|---|---|
| 2260057 | 6/1973 | Germany | 368/84 |
| 3930581 | 3/1991 | Germany. | |
| 63-200127 | 8/1988 | Japan . | |
| 1105219 | 4/1989 | Japan | 345/103 |
| 2063530 | 6/1981 | United Kingdom | 368/84 |

Primary Examiner—Ulysses Weldon
Attorney, Agent, or Firm—Fitzpatrick, Cella, Harper & Scinto

[57] ABSTRACT

A liquid crystal display driven in multiplex with a plurality of pixels arranged in a matrix comprises a main display, and at least one sub-display located at least partly around the periphery of the main display.

10 Claims, 20 Drawing Sheets

F I G. 3
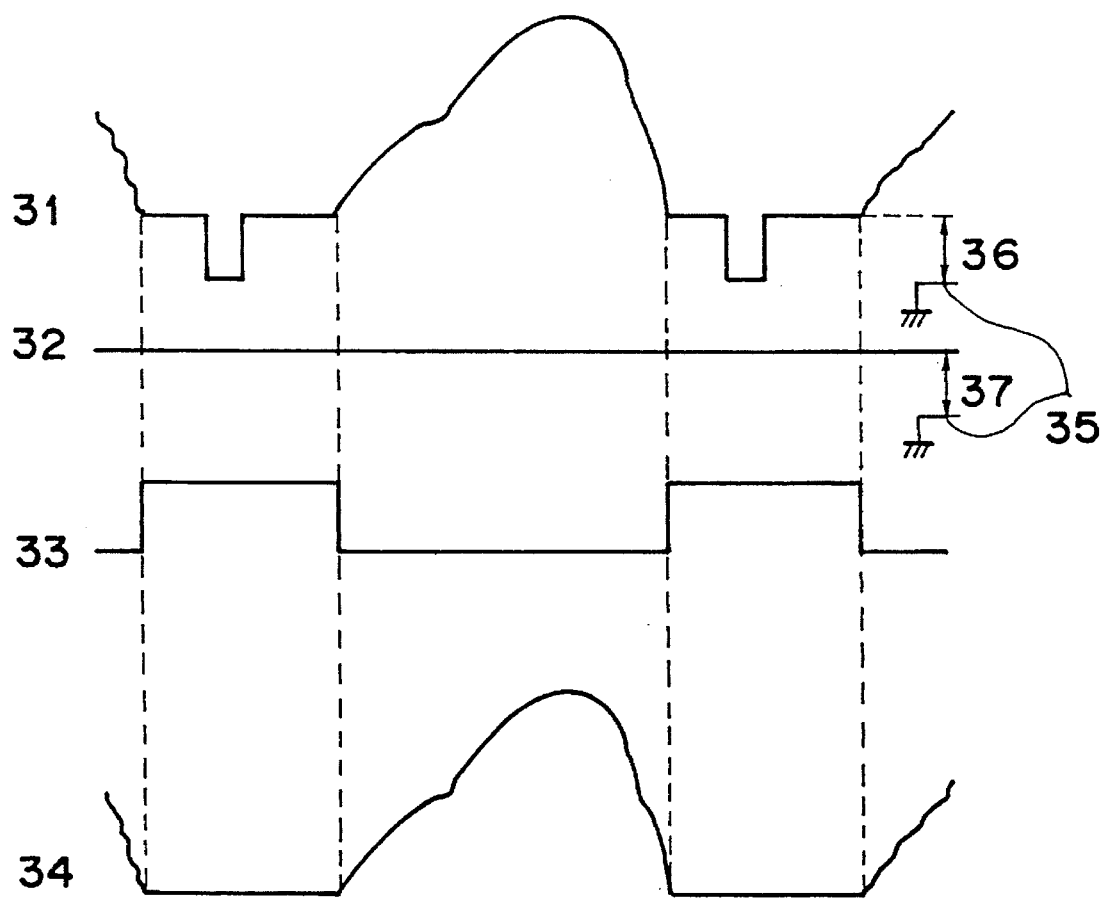

FIG. 19A

|   |   |   |   |   |   |   |
|---|---|---|---|---|---|---|
| R | B | G | R | B | G | R |
| B | G | R | B | G | R | B | G |
| G | R | B | R | B | G | R |
| R | B | G | R | B | G | R | B |
| B | G | R | B | G | R | B | G |
| G | R | B | G | R | B | G | R |

|   |   |   |   |   |   |   |
|---|---|---|---|---|---|---|
|   |   |   | R | B | G | R |
|   |   |   | B | G | R | B | G |
|   |   |   | R | B | G | R |
|   |   |   |   |   |   |   |
|   |   |   |   |   |   |   |
|   |   |   |   |   |   |   |

— 191

— 192

LIQUID CRYSTAL DISPLAY

This application is a continuation of application Ser. No. 08/391,082 filed Feb. 21, 1995 now abandoned, which is a continuation of application Ser. No. 08/283,144 filed Aug. 1, 1994, now abandoned, which is a continuation of application Ser. No. 08/022,510 filed Feb. 25, 1993, now abandoned.

BACKGROUND OF THE INVENTION

1. Field of the Invention

The present invention relates to a liquid crystal display, and more particularly to a liquid crystal display which enables the optimal display.

2. Related Background Art

In recent years, the studies concerning liquid crystals have advanced, and liquid crystals have been developed as an image display medium for television by making use of the characteristics of liquid crystal. In particular, liquid crystal displays are expected for portable television or large-screen television because the thickness of screen can be reduced, and partially have been put on the market.

However, the liquid crystal display has several problems inherent to the properties of liquid crystal. One problem is that it has the non-uniform orientation on the edge of screen.

This non-uniform orientation on the edge of screen is considered due to the fact that pixels on the edge of screen lack adjacent pixel electrodes, producing a step in the pixel electrode substrate, which step may influence the orientation of liquid crystal.

Also, even if this step is relieved, the liquid crystal pixels other than the pixels on the edge of screen, which can take arbitrary orientations, may be influenced by the drive voltage of pixel electrodes on the edge of screen, thereby having effects on a portion of the liquid crystal corresponding to the pixel electrodes on the edge, causing indistinct display thereon.

SUMMARY OF THE INVENTION

In the light of the above-described problems, it is an object of the present invention to provide a liquid crystal display which can make excellent high quality display over an entire area of screen by resolving problem is such as indistinct image on the edge of screen in the liquid crystal display.

Also, it is another object of the present invention to provide a liquid crystal display which can tighten the image displayed on a screen of the liquid crystal display.

In addition, it is a further object of the present invention to provide a liquid crystal display which can overcome a lacking problem of display on the screen due to insufficient precision in the alignment with a light shielding layer around the periphery of the display.

Moreover, it is another object of the invention to provide a liquid crystal display which allows for a sub-display of character information apart from the display portion.

It is another object of the present invention to provide a liquid crystal display which is driven in multiplex, with a plurality of pixels arranged in a matrix, characterized by comprising a main display, and at least one sub-display located at least partly around the periphery of said main display.

Also, it is another object of the present invention to provide a liquid crystal display comprising, a main display having a plurality of pixels arranged in a matrix, and a sub-display provided at least partly around the periphery of said main display, switch means for selecting between a first information signal displayed in said main display and a second information signal displayed in said sub-display, and a drive signal processing circuit for enabling said selected information to appear on said display.

Additionally, it is another object of the present invention to provide a liquid crystal display comprising, a main display having a plurality of pixels arranged in a matrix, and a sub-display provided at least partly around the periphery of said main display, input means for inputting a first information signal displayed on said main display and a second information signal displayed on said sub-display, storage means for storing said second information signal, a first signal processing circuit for making signal processing corresponding to said main display based on said first information signal, and a second signal processing circuit for making signal processing corresponding to said sub-display based on said second information signal.

BRIEF DESCRIPTION OF THE DRAWINGS

FIGS. 3 to 6 are waveform charts which are applicable to the first embodiment of the invention.

FIGS. 7, 19A and 19B are views showing a second embodiment of the invention.

DETAILED DESCRIPTION OF THE PREFERRED EMBODIMENTS

Figure 1:
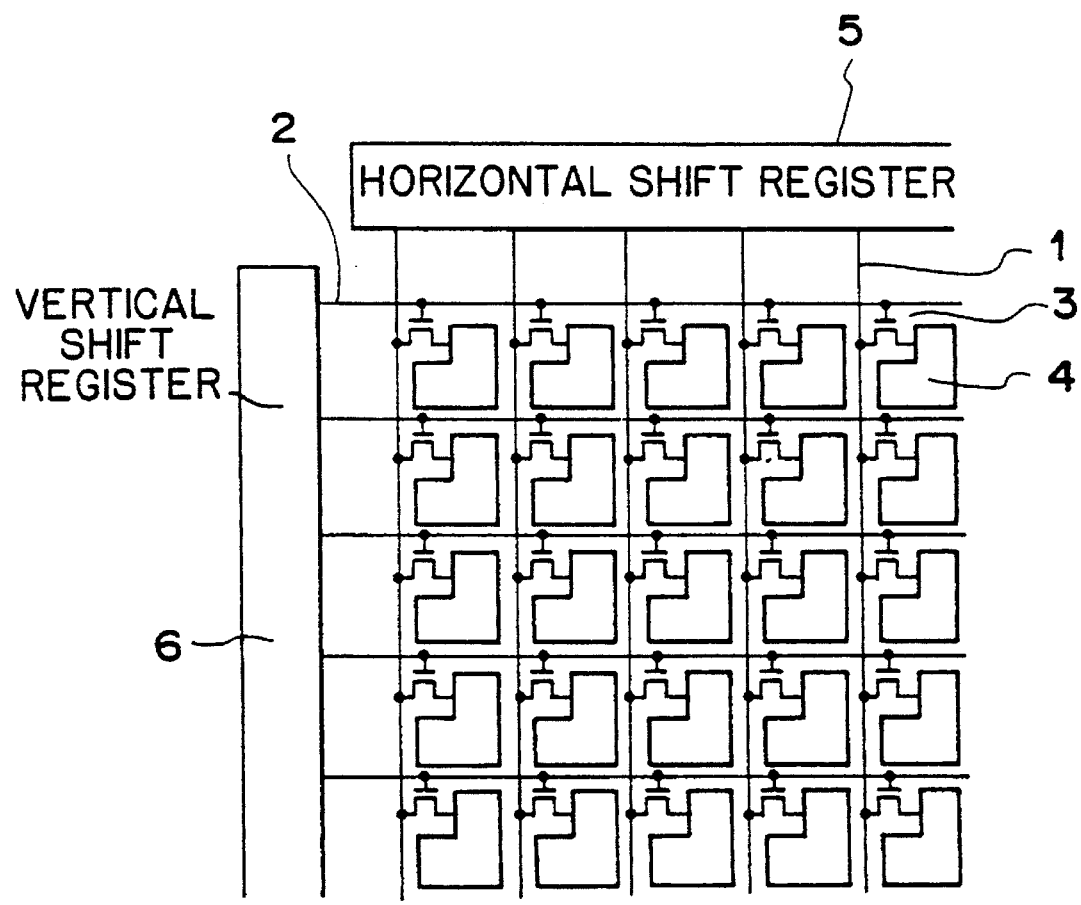
FIG. 1 is a view showing a first embodiment of the present invention.

A liquid crystal display comprises a main display for displaying the image, and a sub-display provided at least partly around the periphery of the main display. In the present invention, the main display may be a conventional image display for displaying the image such as a normal high quality image or character. The sub-display is used for a portion not requiring very high image quality such as character or black representation to improve the image quality on the main display. However, the sub-display can be also used for the image, if required.

In particular, the black representation in the sub-display is effective to raise the distinctness of image by tightening the screen, and provided in at least one part of the top and bottom, and left and right of the main display, preferably, around the periphery of the main display. The black representation according to the present invention is desirably AC driven to prevent the burning of liquid crystal. Further, it is possible that besides the main display and the sub-display with black representation, a second sub-display for displaying the character may be further provided around the periphery of the main display.

In the present invention, the main display and the sub-display may be driven synchronously, but can be driven asynchronously by using separate drive circuits.

The region of black representation according to the present invention is preferably wider to prevent degradation in the display characteristics on the screen, but the width of about five to six scan or display lines can offer sufficient effects, and yields no decrease in the precision of the alignment with a light shielding layer as will be described later. Normally, ten or more lines allows the above degradation to be prevented almost completely.

In displaying characters, the number of scan lines making up at least one character may be satisfied, but in view of the above-mentioned degradation problem, substantially ten or more lines are necessary.

The liquid crystal display of the present invention is also applicable to a color display. The color display has the color filters of three colors, i.e., green (G), red (R) and blue (B), provided on an opposed electrode substrate for each pixel to correspond in sequence to make a multi-color display with the coloration of those filters. In the present invention, when the black representation is made in the color display, it is preferable to also provide the color filter in the region of black representation.

In the present invention, in making the black representation, it is possible to further tighten the screen by providing a light shielding layer on the opposed electrode substrate corresponding to the black representation region. This light shielding layer can extend beyond the black representation region, wherein the display area except for the black representation may be defined by an opening portion of the light shielding layer. In this way, the alignment of the light shielding layer with the black representation region is facilitated, resulting in the improvement in the manufacturing yields.

In the present invention, the size and shape of, and the interval between each pixel electrode, are preferably equal in both the main display and the sub-display, and between both displays, although the size and shape, and the interval, are not necessarily equal. It is only necessary that the orientation of liquid crystal on the edge of the main display has the same characteristics of orientation as on the other portion than the edge of the main display so as to give rise to substantially uniform orientation.

Embodiments

The present invention will be specifically described below in connection with the embodiments, but is not limited to those embodiments.

Embodiment 1

FIG. 1 shows a schematic constitutional view of a first embodiment to which the present invention is applicable. A device of FIG. 1 is a liquid crystal display of the active matrix drive type in which a switching element consisting of a TFT (thin film transistor) is provided for each pixel. In the FIG., 1 is a display (signal) line, 2 is a scan (signal) line, 3 is a TFT element, 4 is a pixel electrode, 5 is a horizontal shift register, and 6 is a vertical shift register.

Figure 2:
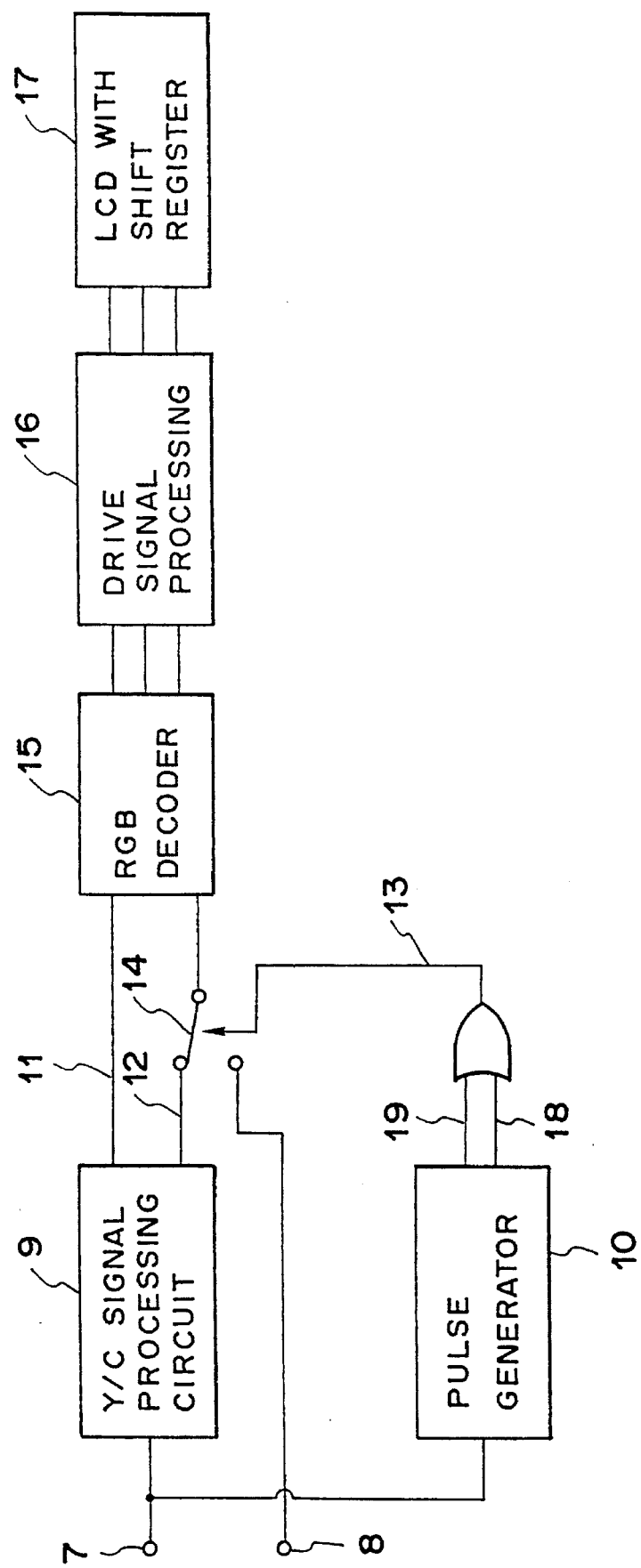
FIG. 2 is a drive circuit diagram in the first embodiment of the present invention.

FIG. 2 shows a drive circuit diagram of the liquid crystal display. In the FIG., 7 is an image signal input terminal, 8 is a black level signal terminal, 9 is a Y/C signal processing circuit, 10 is a pulse generator, 11 is a chroma signal line, 12 is a bright signal, 13 is a switching line, 14 is an analog switch, 15 is an RGB decoder (primary color signal converter), 16 is a drive signal processing circuit, 17 is an LCD with shift register (liquid crystal panel), 18 is a vertical blanking pulse signal line, and 19 is a horizontal blanking pulse signal line.

Figure 4:
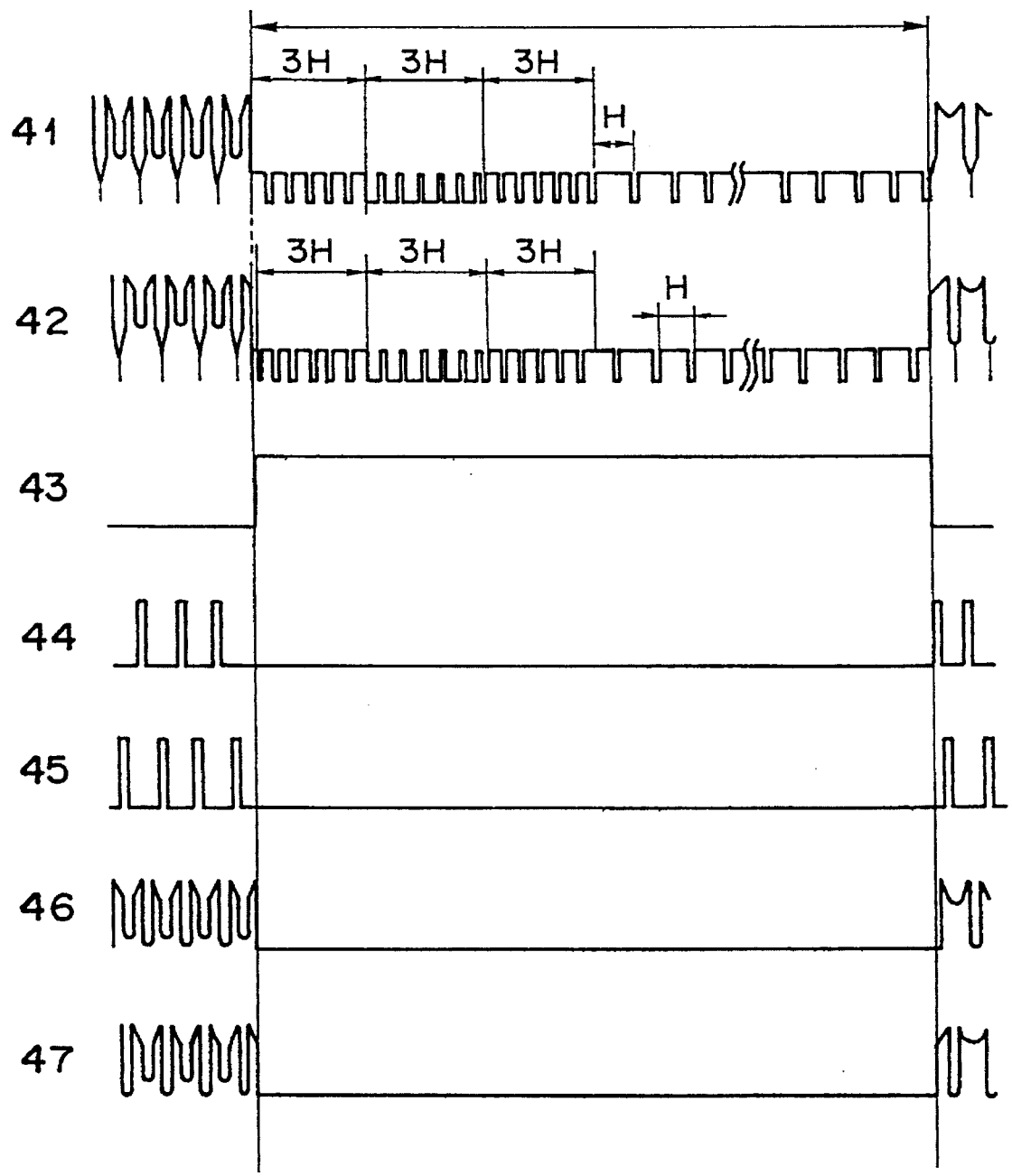

FIGS. 3 and 4 are waveform charts of the circuit of FIG. 2. In FIG. 3, 31 is a bright signal waveform, 32 is a black level signal waveform, 33 is a horizontal blanking pulse, 34 is an analog switch output waveform, 35 is a reference voltage, and 36 and 37 are black level voltages. Normally, the potentials 36, 37 have the same value. Also, FIG. 4 shows the behaviors of some signals near the vertical blanking period. In the FIG., 41 is a first field bright signal, 42 is a second field bright signal, 43 is a vertical blanking pulse, 44 is a horizontal blanking pulse in the first field, 45 is a horizontal blanking pulse in the second field, 46 is an output waveform of the analog switch in the first field, and 47 is an output waveform of the analog switch in the second field.

In FIG. 2, an image signal input via the image signal input terminal 7 is input into the Y/C signal processing circuit 9 on one hand, and the pulse signal generator 10 on the other hand. The image signal of the Y/C signal processing circuit 9 is separated into a bright signal and a chroma signal, which are output to signal lines 11, 12, respectively. The bright signals 31, 41, 42 are input to the analog switch 14. The analog switch 14 is controlled by a signal on the switching line 13 to select a black level signal 32 to be input via the black level signal input terminal 8 when the signal is at "H" level, and the bright signals 31, 41, 42 when at "L" level. The signal on the switching line 13 is a logical sum of horizontal blanking signals 33, 44, 45 and a vertical blanking signal 43 which are generated by the pulse generator 10. Accordingly, the waveform output via the analog switch 14 is a black level signal in the vertical and horizontal blanking periods, and a bright signal in other periods, as represented in the waveform charts 34, 46, 47. This signal and a chroma signal through the chroma signal line 11 are input to an RGB decoder 15 for the conversion into an RGB signal. Each primary color signal is input into the drive signal processing circuit 16 to make the signal processing for driving the LCD, and then sent to the LCD 17.

Figure 5:
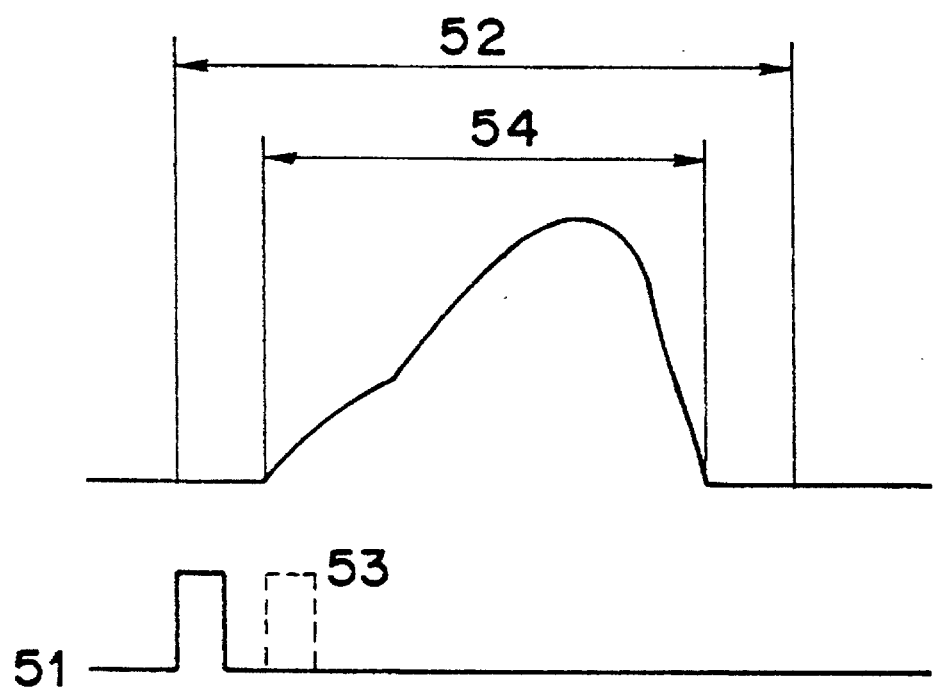

The shift registers of the LCD 17, that is, a display line shift register (horizontal shift register 5 in FIG. 1) and a scan line shift register (vertical shift register 6 in FIG. 1), have more stages by the number of black level drive pixels, respectively, to output a portion to be driven by a black level signal around the periphery of the image display. The start pulse for such shift register is issued at an earlier timing by the number of black level drive pixels, such as a waveform 51 of FIG. 5 in the case of display line, so that the range as indicated by 52 is sampled. Accordingly, the sub-display on the left and right hands of screen can be represented in black. Conventionally, the start pulse of the shift register occurred at a position 53, and the sampling range was as indicated by 54, so that the intended region could not be represented in black.

Figure 6:
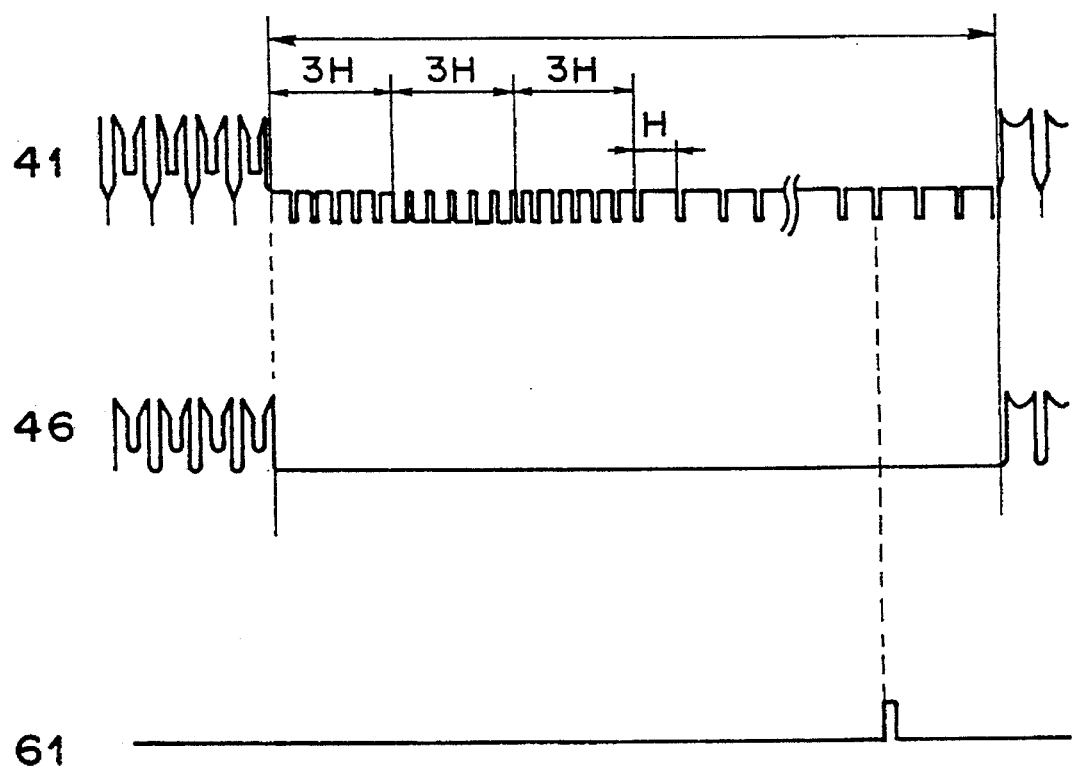

Likewise, if the start pulse of the scan line shift register is made earlier by the number of scan lines to be scanned by the black level, such as a waveform 61 in FIG. 6, the sub-display on the top and bottom of the screen can be represented in black.

Embodiment 2

Figure 7:
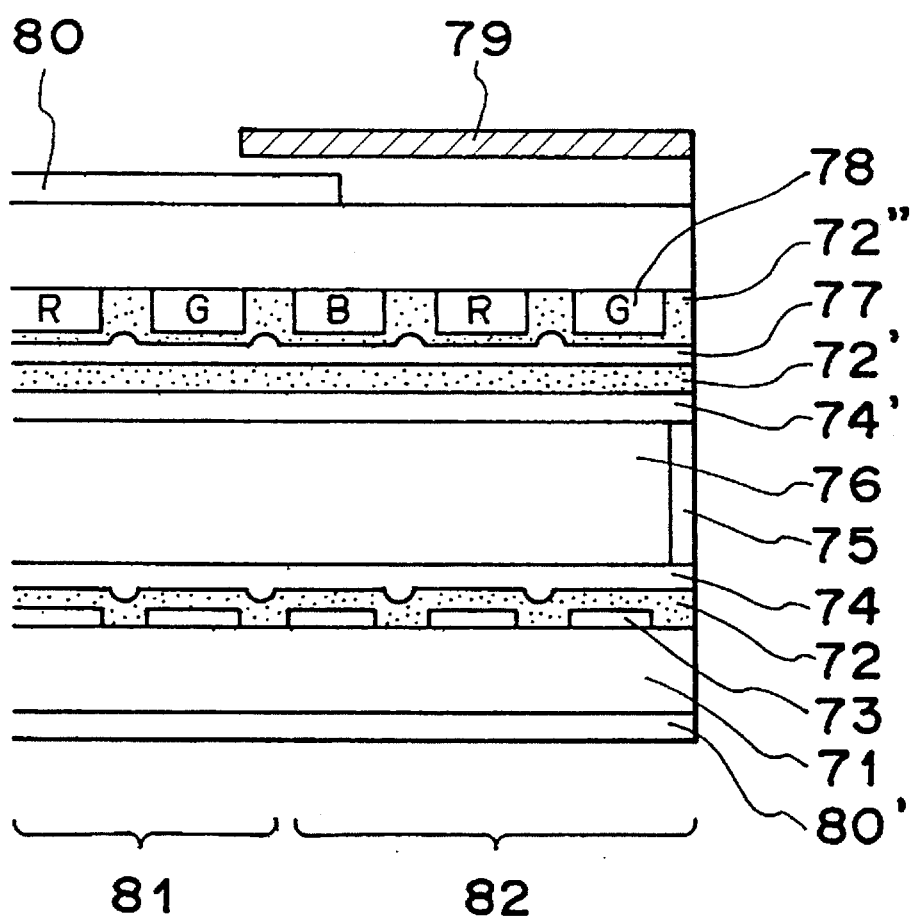

FIG. 7 shows a second embodiment of the present invention. This embodiment is a color display of the active matrix type using a TFT for the switching element. In the FIG., 71 is a TFT substrate, 72 to 72" are insulation layers, 73 is a pixel electrode, 74 and 74' are orientation control membranes, 75 is a seal member, 76 is a liquid crystal, 77 is an opposed electrode, 78 is a color filter, 79 is a parting plate, 80 is a polarizing plate, 81 is a main display, and 82 is a sub-display for the black representation. As in this embodiment, by providing a dummy color filter corresponding to the sub-display 82 in an opposed electrode plate, the orientation of liquid crystal can be held uniform, resulting in improved distinctness of image on the edge of the main display 81.

Figure 8:
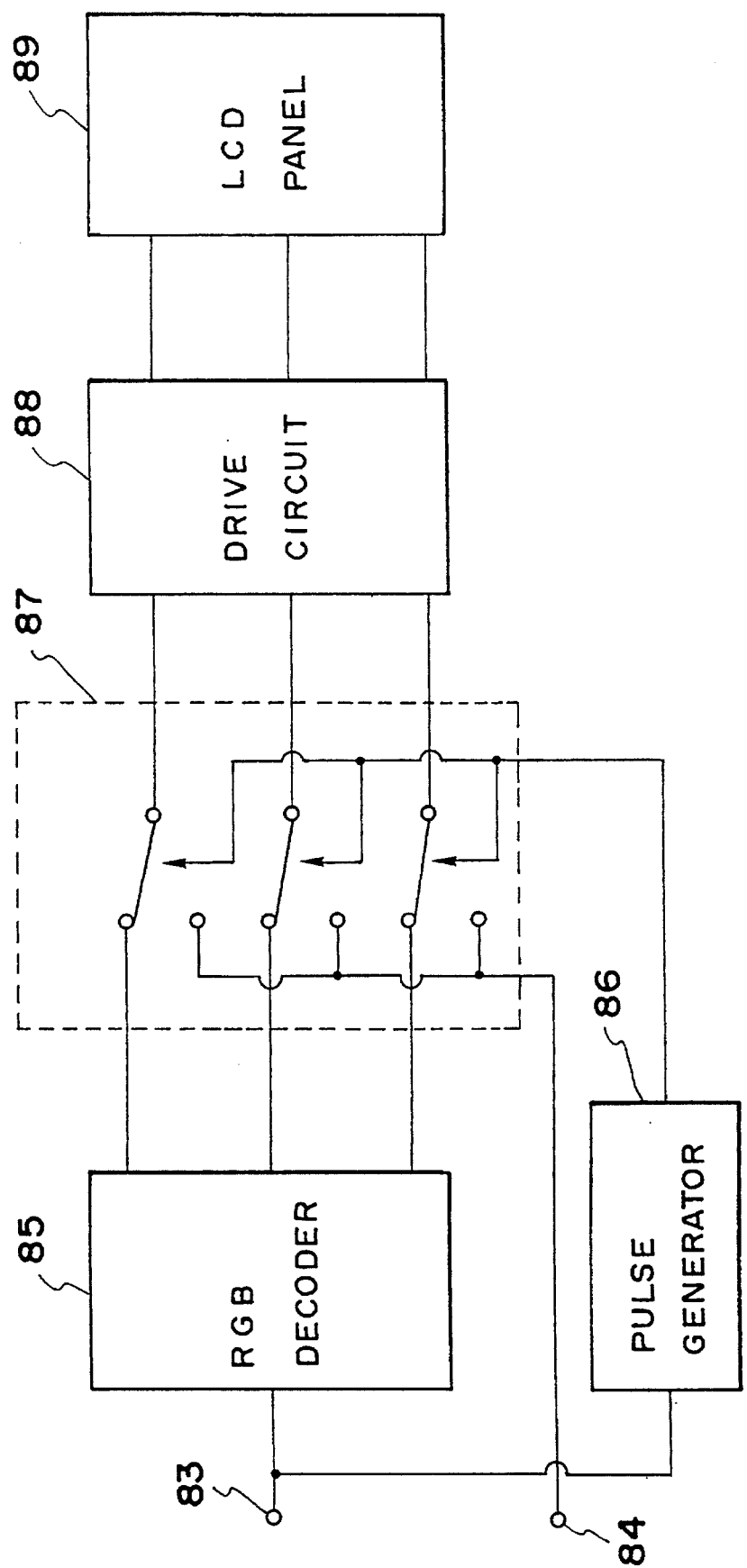
FIG. 8 is a circuit diagram of the second embodiment of invention.

FIG. 8 shows a circuit in this embodiment in which the switching of the image signal and the black level signal is made through an RGB signal, but not a bright signal. In the FIG., 83 is an image signal input terminal, 84 is a black level signal input terminal, 85 is an RGB decoder, 86 is a pulse generator, 87 is an analog switch, 88 is a drive circuit, and 89 is an LCD panel.

Figure 9:
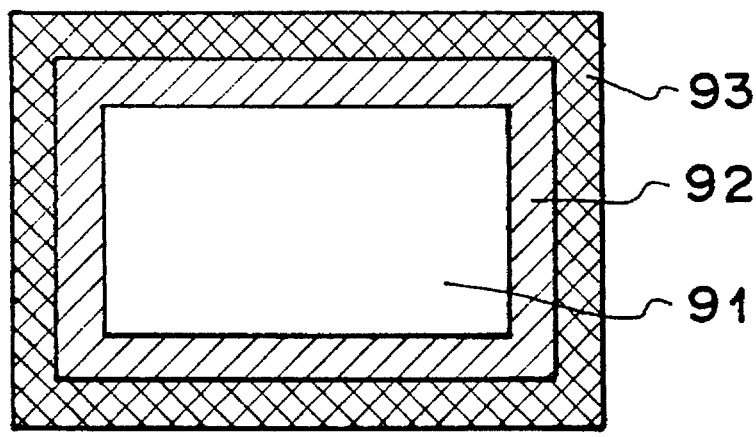
FIG. 9 is a view showing an application example in the second embodiment of the invention.

Further, FIG. 9 shows the main display and sub-display areas, where a light shielding layer is further provided in this embodiment. In the FIG., 91 is a main display, 92 is a light shielding layer, and 93 is a black representation region. In this figure, the light shielding layer 92 extends from the black representation region 93 inwardly of the main display, and can limit the sub-display.

In this embodiment, the black representation can be made by using the coloration. In a color display, the arrangements appropriate for the main display and the sub-display, respectively, may be taken among several RGB pixel arrangements, but it is not necessary to put together both arrangements. FIG. 19A shows a device example in which the pixel arrangement of the main display is different from that of the sub-display. In the FIG., 191 is a main display, and 192 is a sub-display. In this way, by taking the optimal pixel arrangement for the display purposes, the image quality can be improved.

In this embodiment, it will be appreciated that the main display may display the image except for characters in color, and the sub-display may display character information in black and white. This device example is shown in FIG. 19B. In the FIG., 191 is a main display, and 192 is a sub-display. The sub-display formed in black and white can have a greater definition than in color, allowing the character information to be read more clearly.

Embodiment 3

Figure 10:
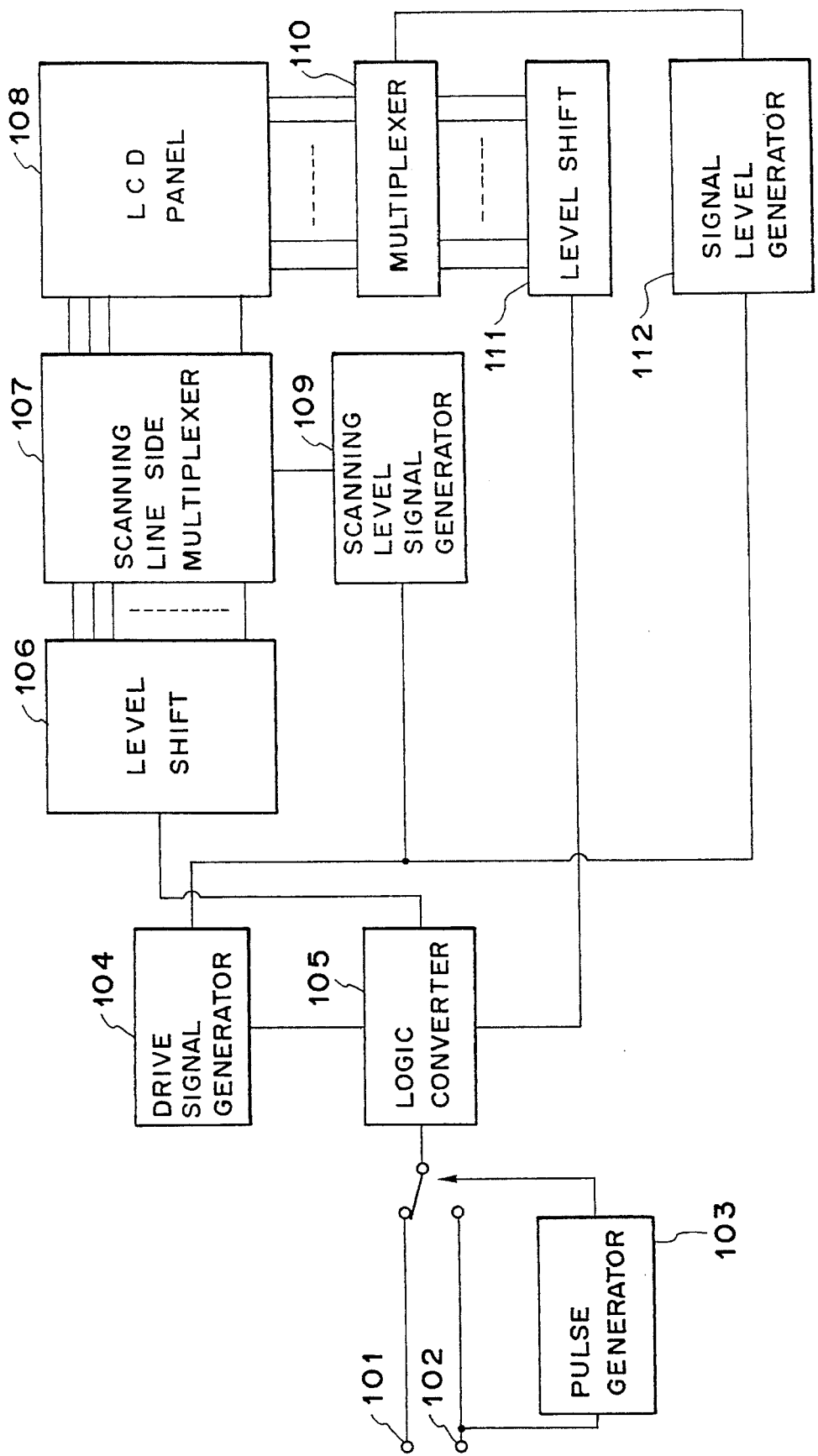
FIG. 10 is a block diagram showing a third embodiment of the invention.

FIG. 10 shows a third embodiment of the present invention. This embodiment is a liquid crystal display of the dot matrix type. In FIG. 10, 101 is a black level signal input terminal, 102 is an image signal input terminal, 103 is a pulse generator, 104 is a drive signal generator, 105 is a logic converter, 106 is a level shift, 107 is a scan side multiplexer, 108 is an LCD panel, 109 is a scan level generator, 110 is a signal side multiplexer, 111 is a level shift, and 112 is a signal level generator.

In this case, like the previous embodiments, a black level signal is supplied from the signal side multiplexer 110 to signal lines corresponding to both the left and right edges of the LCD panel 108, and with an image signal from the scan side multiplexer 107, the area of the LCD panel 108 except for the scan lines corresponding to both the upper and lower edges of the LCD panel 108 is scanned at certain timings.

That is, in accordance with an image signal corresponding to one scanning or one screen, either the black level signal or the image signal is supplied to the logic converter 105 by the pulse generator. And in accordance with a signal from the logic converter 105, the generation timing for the scan level signal and the signal level signal is taken.

With this embodiment, it is possible to display an excellent image without degradation on the edges of the image.

Embodiment 4

Figure 11:
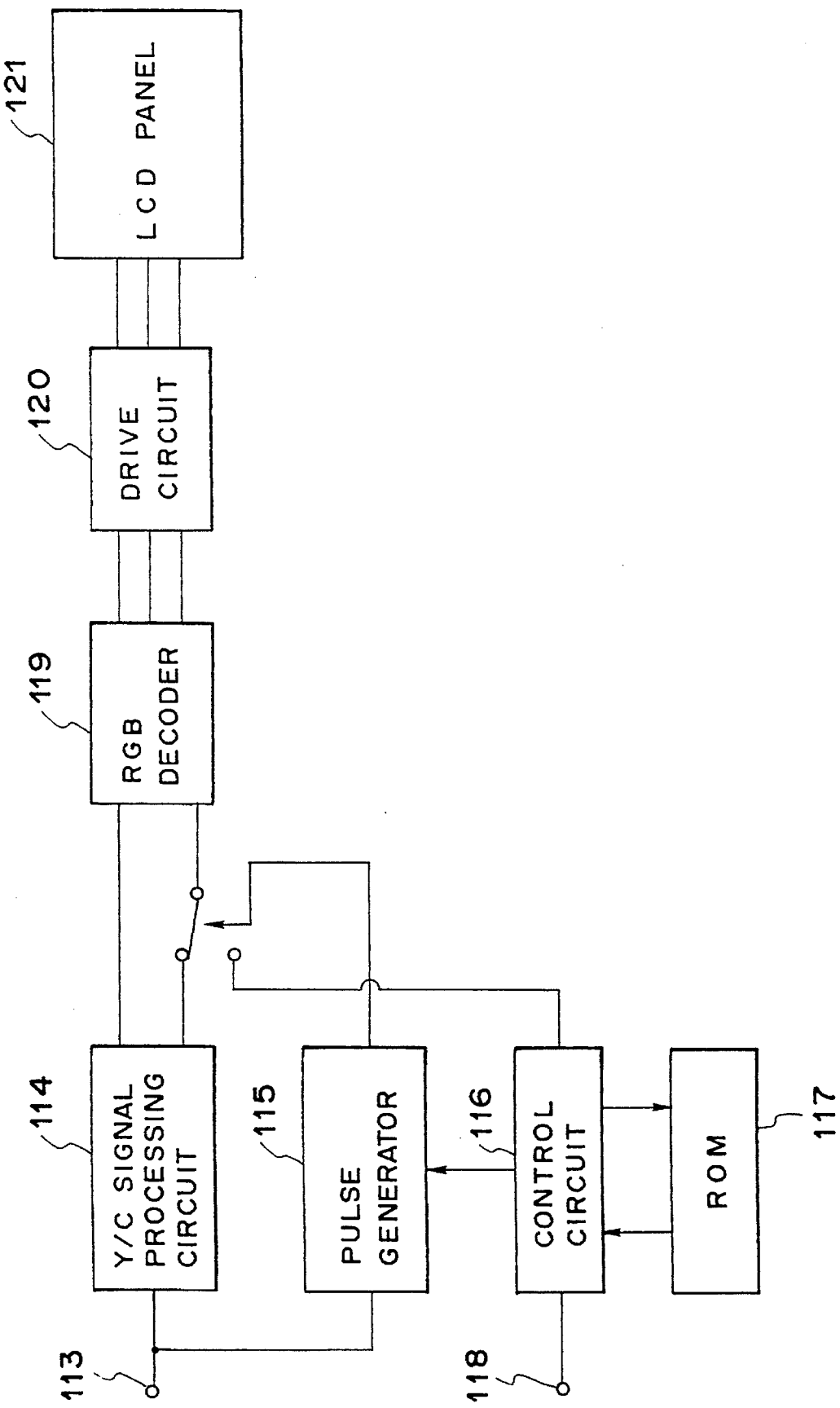
FIG. 11 is a block diagram showing a fourth embodiment of the invention.

FIG. 11 shows a fourth embodiment of the present invention. This embodiment is a device in which the sub-display displays the character information and the main display displays the image except for characters. In FIG. 11,113 is an image signal input terminal, 114 is a Y/C signal processing circuit, 115 is a pulse signal generator, 116 is a control circuit, 117 is a ROM (read only memory.), 118 is an external control signal input terminal, 119 is an RGB decoder, 120 is a drive circuit, and 121 is an LCD panel. In this embodiment, the kinds of characters to be displayed on the screen are controlled by an external control signal, so that corresponding data can be output from the ROM. With this circuit, the output state of no character, e.g., black representation, is enabled. This embodiment allows both the character information and the image to be displayed distinctly, because they are independently displayed from each other.

Embodiment 5

Figure 12:
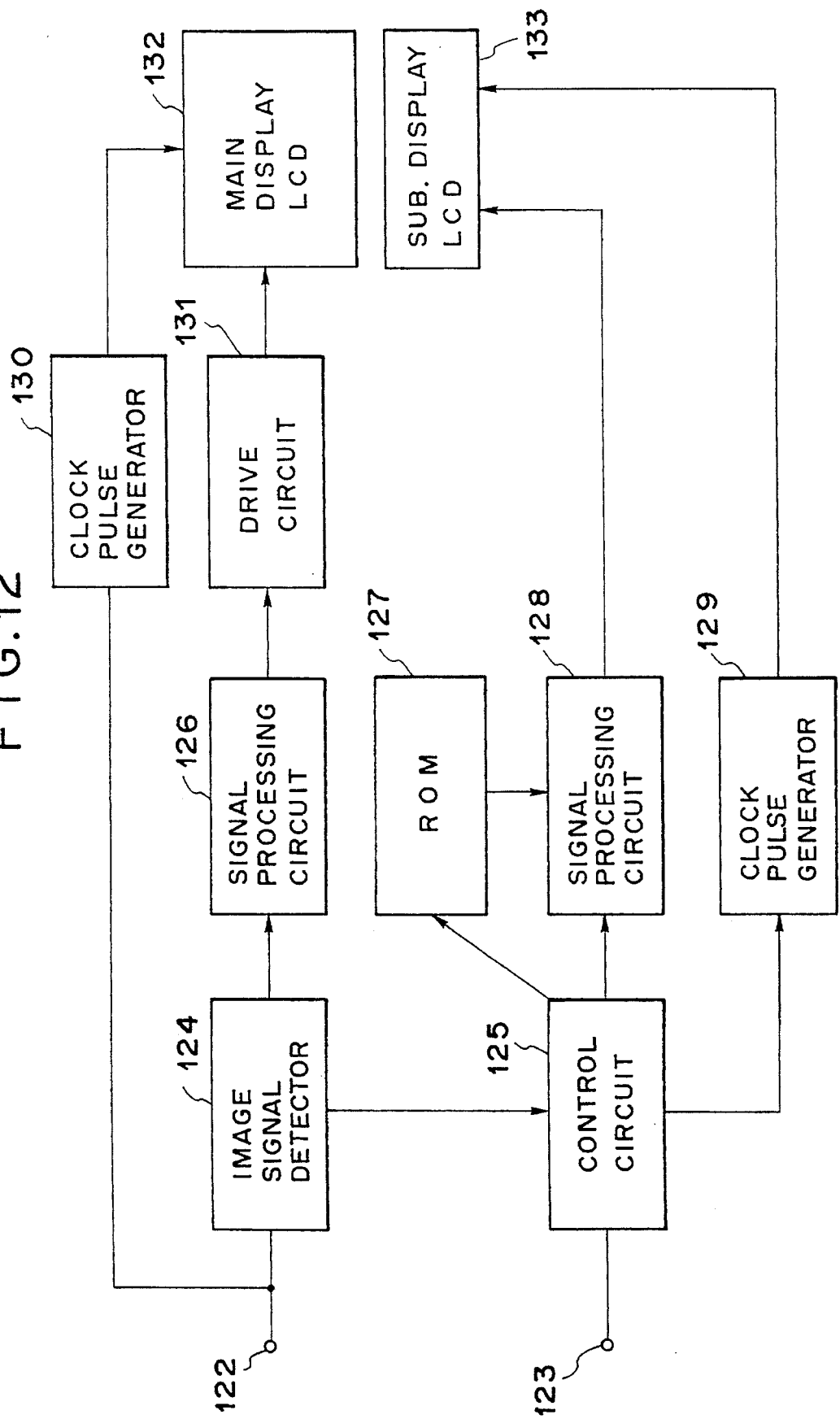
FIGS. 12 and 20 are a block diagram and a view showing a fifth embodiment of the invention, respectively.

FIG. 12 shows a circuit diagram of a fifth embodiment according to the present invention. This embodiment allows the character information to be displayed in the sub-display, and the image except for the character information to be displayed in the main display. In this embodiment, the main display and the sub-display can be driven asynchronously, that is, independently of each other. In FIG. 12, 122 is an image signal input terminal, 123 is an external control signal input terminal, 124 is an image signal detector, 126 is a signal processing circuit, 127 is a ROM, 128 is a signal processing circuit, 129 and 130 are clock pulse generators, 131 is a drive circuit of the main display, 132 is a main display LCD, and 133 is a sub-display LCD.

Figure 13:
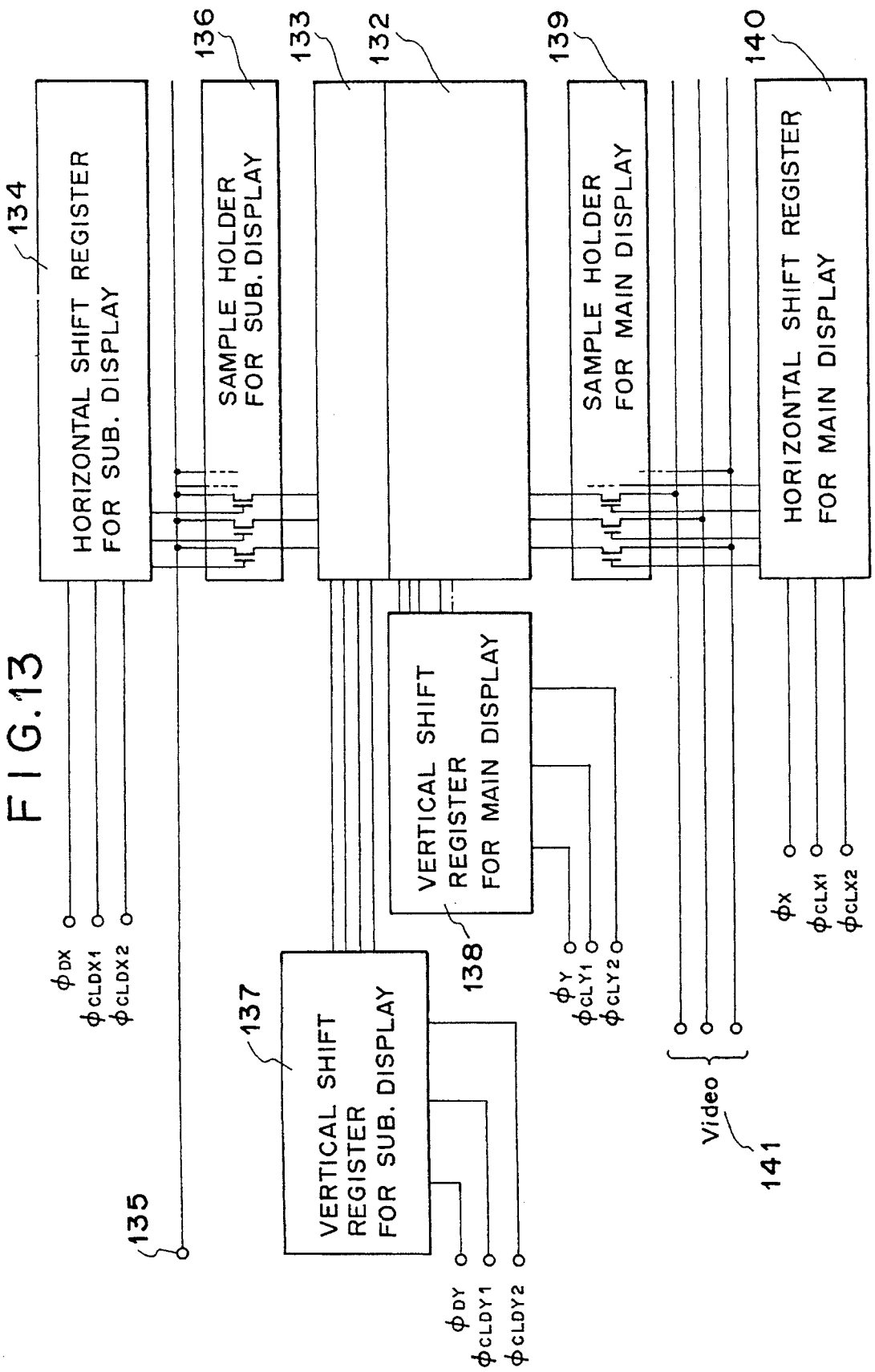
FIGS. 13 to 15 are diagrams showing the combination examples in the fifth embodiment of the invention.
Figure 14:
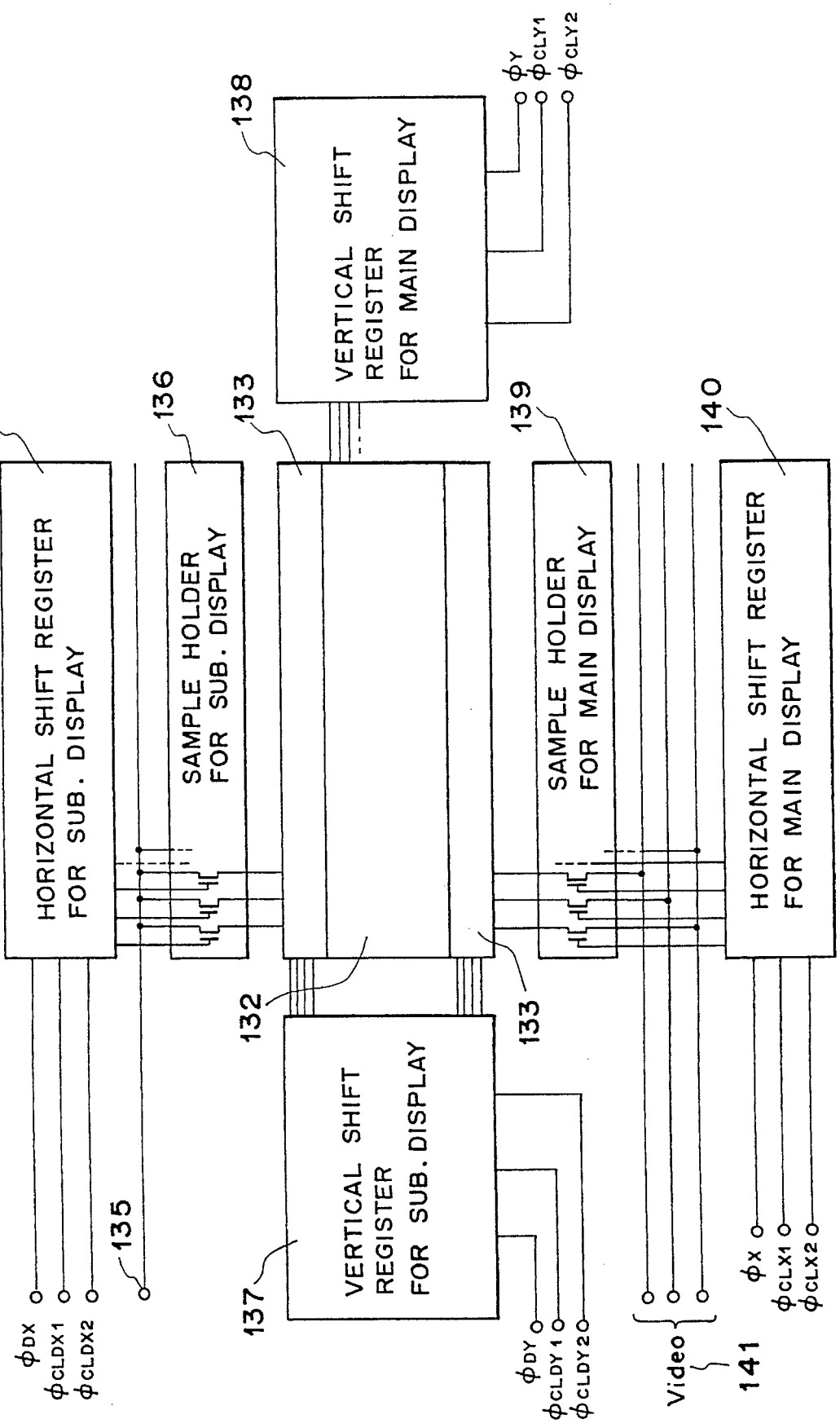
Figure 15:
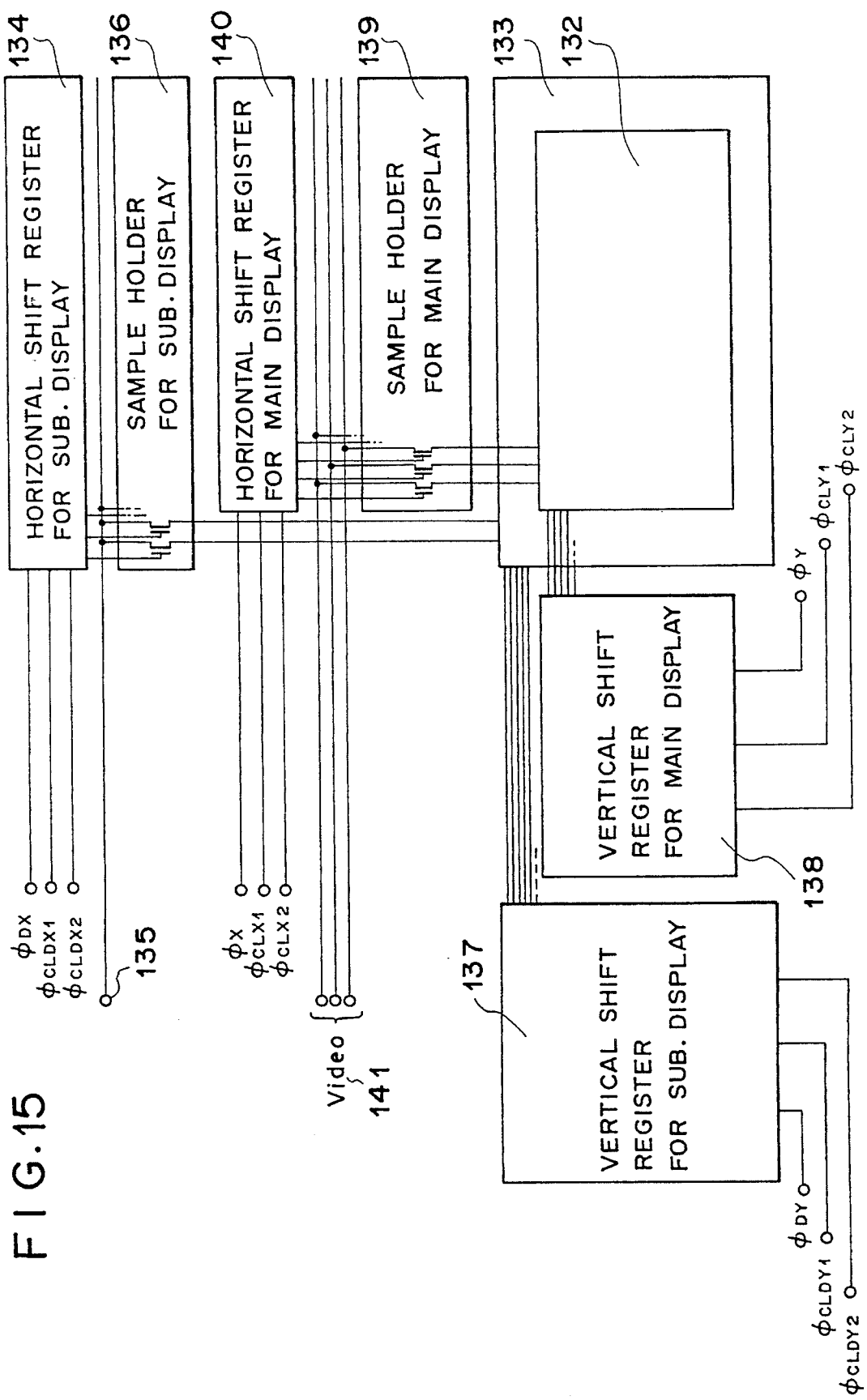

FIGS. 13 to 15 show combination examples of the main display and the sub-display in this embodiment. In the FIG., 134 is a horizontal shift register for sub-display having a start pulse input terminal $\phi_{DX}$ and transfer clock input terminals $\phi_{CLDX1}$ and $\phi_{CLDX2}$. 135 is a display signal input terminal for sub-display, 136 is sample holder for sub-display, and 137 is a vertical shift register for sub-display having a start pulse $\phi_{DY}$ and transfer clock input terminals $\phi_{CLDY1}$ and $\phi_{CLDY2}$. 138 is a vertical shift register for main display having a start pulse input terminal $\phi_y$ and transfer clock input terminals $\phi_{CLY1}$ and $_{CLY2}$. 139 is a sample holder for main display, and 140 is a shift register for main display having a start pulse input terminal $\phi_X$ and transfer clock input terminals $\phi_{CLX1}$ and $\phi_{CLX2}$. 141 is a video signal (display signal for main display) input terminal.

FIG. 13 is an example in which the sub-display is provided about the main display, FIG. 14 is an example in which the sub-display is provided above and under the main display, and FIG. 15 is an example in which the sub-display is provided around the periphery of the main display. Besides these, the sub-display can be provided on the left side and/or the right side, on the lower side, on the upper side and the left side, or on the upper side and the right side of the main display.

Figure 20:
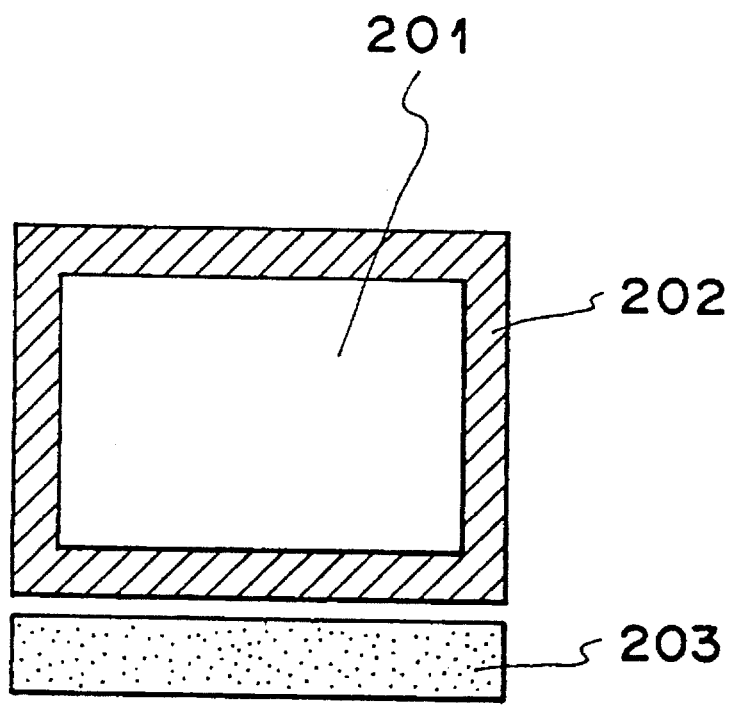

In the present invention, for example, when the black and character representations are concurrently made by combining a sub-display which is driven synchronously with the main display and a sub-display which is driven asynchronously therewith, the sub-display for the black representation may be driven synchronously with the main display, and the sub-display for the character may be driven asynchronously. FIG. 20 shows an example of the device. In the FIG., 201 is a main display, 202 is a sub-display a, and 203 is a sub-display b. The sub-display a 202 makes the black representation in synchronism with the main display 201, and the sub-display b 202 displays character information in asynchronism with the main display 201. In this device, the sub-display for the character information, if operated asynchronously with the main display for the image, can be provided with a higher definition, and the main display has the black representation peripherally, so that the image quality can be improved as a whole.

Embodiment 6

Figure 16:
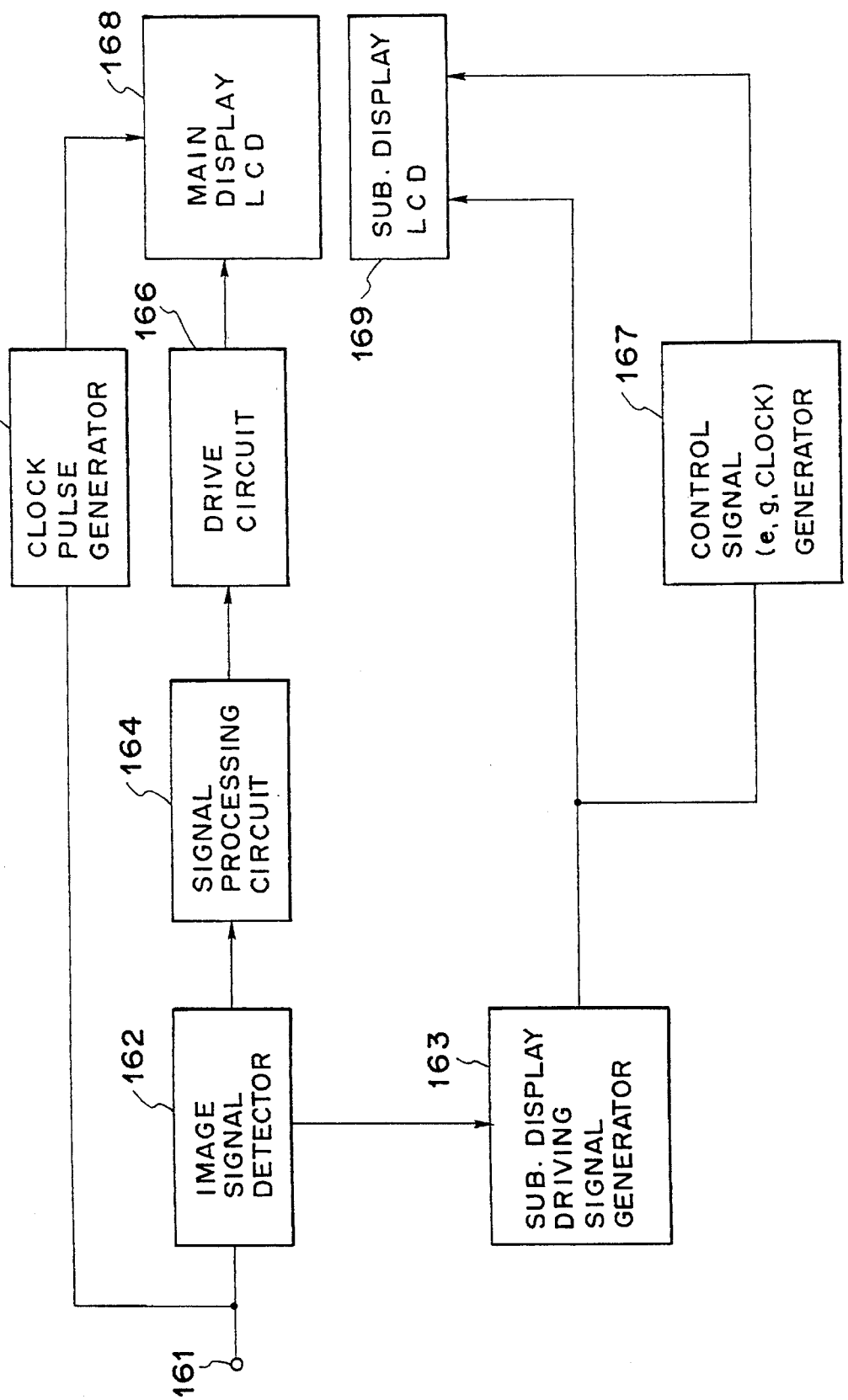
FIG. 16 is a block diagram showing a sixth embodiment of the invention.
Figure 18:
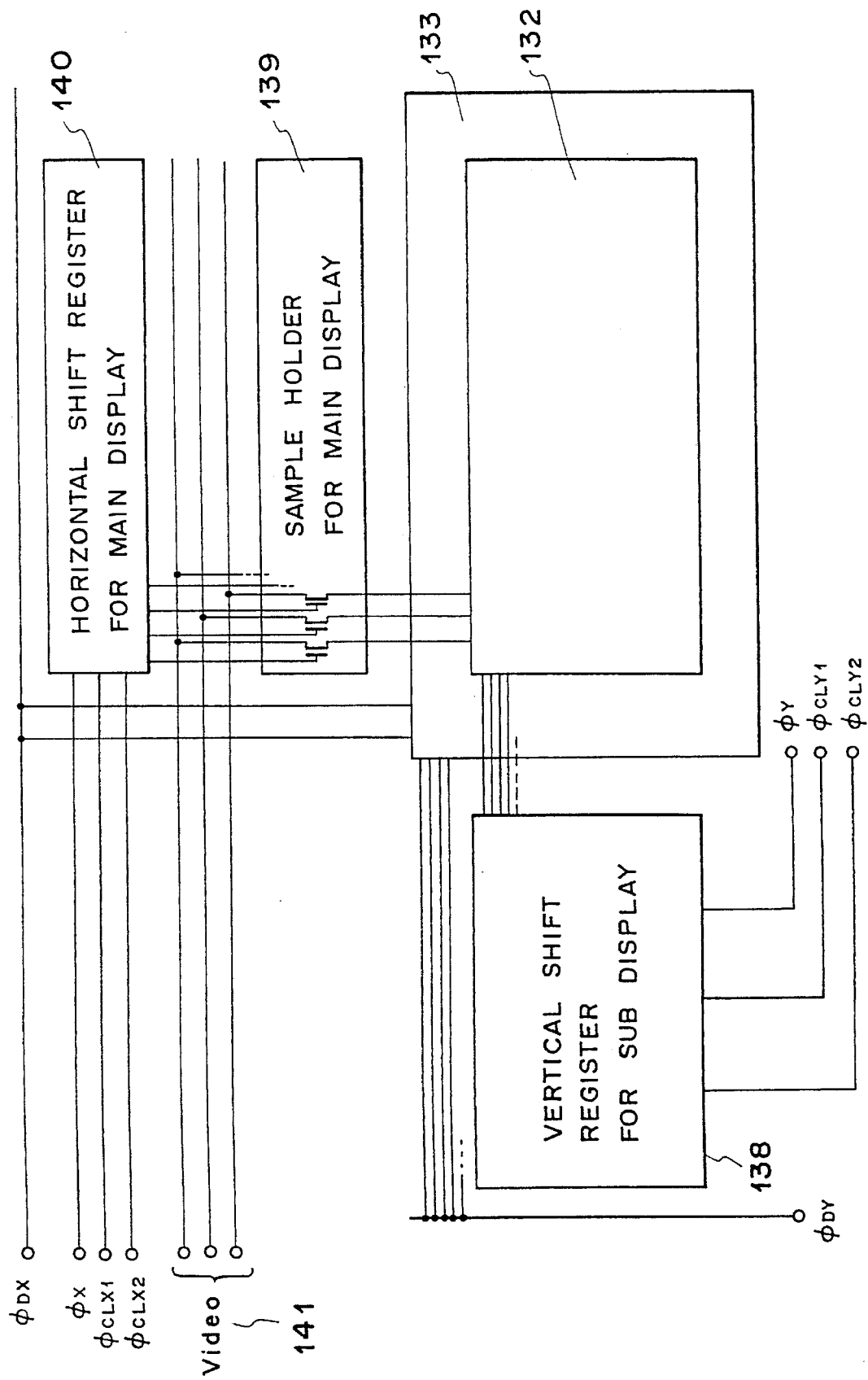
FIG. 18 is a block diagram showing an eighth embodiment of the invention.

FIG. 16 shows a sixth embodiment of the present invention. This embodiment has a circuit in which in the embodiment 5, the display signal lines and/or the scan signal lines in the sub-display are short-circuited to one or more transmission lines, without intervention of any shift register, so that each pixel is driven with the same signal. In FIG. 16, 161 is an image signal input terminal, 162 is an image signal detector, 163 is a sub-display drive signal generator, 164 is a signal processing circuit, 165 is a clock pulse generator, 166 is a drive circuit, 167 is a control signal (e.g., clock) signal generator, 168 is a main display LCD, and 169 is a sub-display LCD. FIG. 18 shows a device example in which the scan line side and the display line side are both short-circuited in this embodiment.

In this embodiment, nothing that the sub-display in making the black representation may be driven in asynchronism with the main display, and displays no image, unlike the main display, the signal is directly input into the signal line without any circuit such as a shift register and a sample holder. Accordingly, the sub-display for black representation can be implemented without the use of any large circuit.

Embodiment 7

Figure 17:
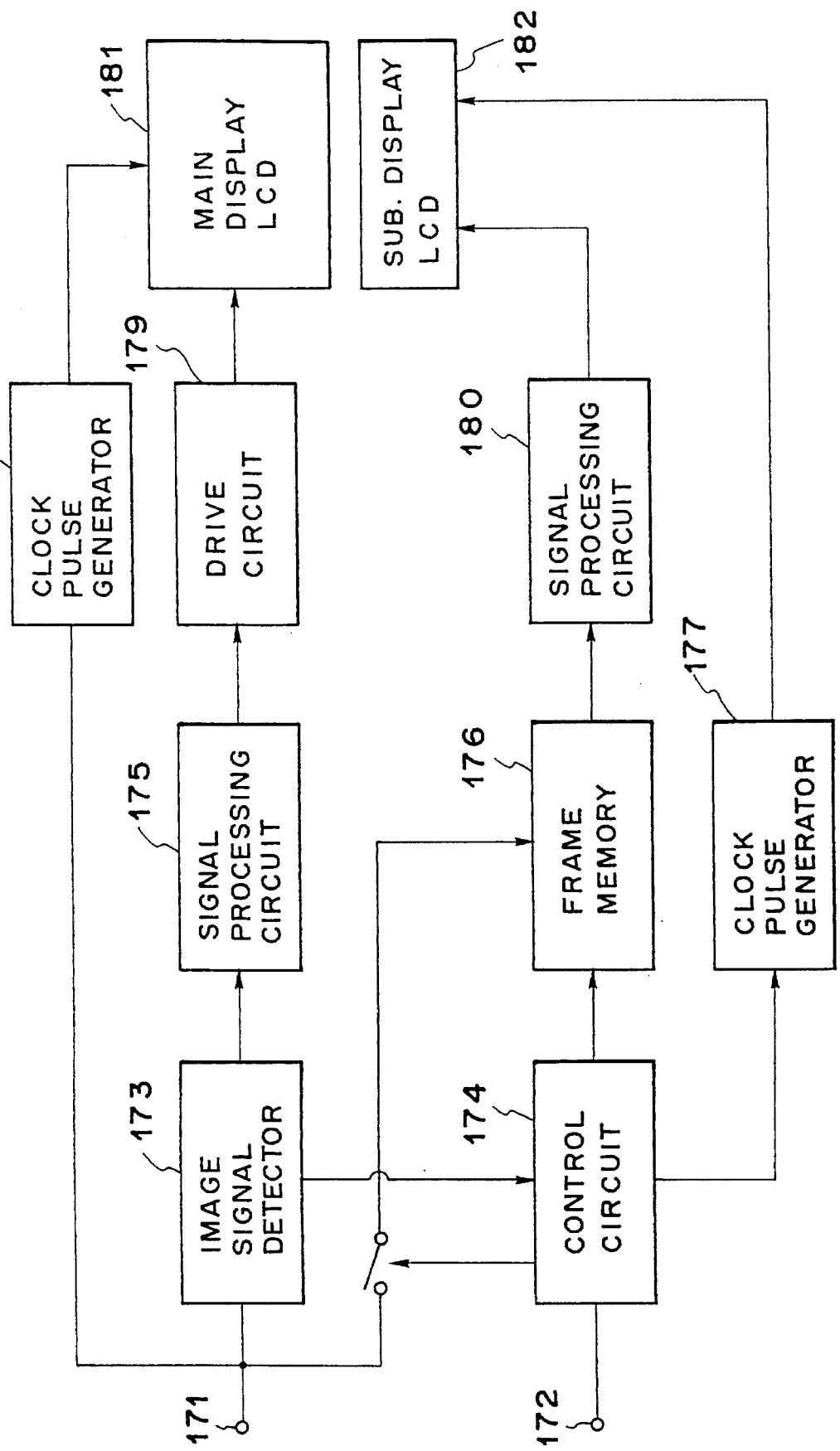
FIG. 17 is a block diagram showing a seventh embodiment of the invention.

FIG. 17 shows a circuit of a seventh embodiment according to the present invention. This embodiment is a device for displaying the image such as a still image in which the sub-display is subdivided into a plurality of divisions. In the FIG., 171 is an image signal input terminal, 172 is an external control signal input terminal, 173 is an image signal detector, 174 is a control circuit, 175 is a signal processing circuit, 176 is a frame memory, 177 and 178 are clock pulse generators, 179 is a drive circuit, 180 is a signal processing circuit, 181 is a main display LCD and 182 is a sub-display LCD.

In this embodiment, in place of a ROM used for storing the character as previously described, the frame memory 176 for storing image information is used, wherein the information in the frame memory 176 is output to the sub-display.

Note that in this embodiment, by providing the sub-display LCD 182 around the periphery of the main display LCD 181, the main display LCD 181 can make more excellent display on the edge thereof. Also, like the previous embodiments, the sub-display LCD is supplied with the black information, except when otherwise required, so that it is possible to further tighten the main display.

The liquid crystal display of the invention allows the uniform and distinct image to be displayed on the entire area of screen including the edges thereof by providing a sub-display.

Also, by allowing the sub-display to display character information, separately from the main display, both the main display and the sub-display are easier to view, resulting in high qualities of display.

According to the present invention, there is provided a device for allowing the character information and others to be displayed in the optimal condition, as with the teletext in the television broadcasting.

Note that the shape of pixel in the sub-display may be different from that in the main display, either in the dot matrix or the segment form.

While the present invention has been described, it will be understood that various changes and combinations may be made within the scope of the present invention.

What is claimed is:

1. A liquid crystal display which is driven in multiplex comprising:

a main display having a plurality of pixels arranged in a matrix, and a sub-display provided at least partly around a periphery of said main display;

switch means for selecting between an information signal displayed in said main display and a black level signal displayed in said sub-display; and a drive signal processing circuit for enabling the selected signal to appear on said liquid crystal display, wherein switch means is switched according to a logical sum of horizontal blanking signals and a vertical blanking signal, and said sub-display always presents a black representation.

2. The liquid crystal display according to claim 1, further comprising signal generating means for switching said switch means.

3. The liquid crystal display according to claim 1, wherein said switch means is switched corresponding to said information signal.

4. The liquid crystal display according to claim 3, wherein said information signal has a bright signal.

5. The liquid crystal display according to claim 3, wherein said information signal has an RGB signal.

6. A liquid crystal display which is driven in multiplex comprising:

a main display having a plurality of pixels arranged in a matrix, and a sub-display provided at least partly around a periphery of said main display;

switch means for selecting between an information signal displayed in said main display and a black level signal displayed in said sub-display; and a drive signal processing circuit for enabling the selected signal to appear on said liquid crystal display, wherein switch means is switched according to horizontal blanking signals and a vertical blanking signal, and said sub-display always presents a black representation.

7. The liquid crystal display according to claim 6, further comprising signal generating means for switching said switch means.

8. The liquid crystal display according to claim 6, wherein said switch means is switched corresponding to said information signal.

9. The liquid crystal display according to claim 8, wherein said information signal has a bright signal.

10. The liquid crystal display according to claim 8, wherein said information signal has an RGB signal.

* * * * *